(12) United States Patent
Dostal et al.

(10) Patent No.: US 8,877,097 B2
(45) Date of Patent: Nov. 4, 2014

(54) METHOD FOR THE GENERATION OF SYNTHESIS GAS

(75) Inventors: Johannes Dostal, Dortmund (DE); Domenico Pavone, Bochum (DE)

(73) Assignee: ThyssenKrupp Uhde GmbH, Dortmund (DE)

( * ) Notice: Subject to any disclaimer, the term of this patent is extended or adjusted under 35 U.S.C. 154(b) by 0 days.

(21) Appl. No.: 13/823,230

(22) PCT Filed: Sep. 2, 2011

(86) PCT No.: PCT/EP2011/004435
§ 371 (c)(1),
(2), (4) Date: Mar. 14, 2013

(87) PCT Pub. No.: WO2012/034654
PCT Pub. Date: Mar. 22, 2012

(65) Prior Publication Data
US 2013/0168608 A1 Jul. 4, 2013

(30) Foreign Application Priority Data

Sep. 15, 2010 (DE) .......................... 10 2010 045 537

(51) Int. Cl.
| | | |
|---|---|---|
| *C01B 3/38* | (2006.01) | |
| *C10B 43/14* | (2006.01) | |
| *C10J 3/52* | (2006.01) | |
| *C10J 3/84* | (2006.01) | |
| *C10J 3/48* | (2006.01) | |
| *C10K 1/02* | (2006.01) | |
| *C10K 3/04* | (2006.01) | |
| *C01B 3/36* | (2006.01) | |
| *C01B 3/48* | (2006.01) | |

(52) U.S. Cl.
CPC ................. *C10B 43/14* (2013.01); *C10J 3/526* (2013.01); *C10J 3/84* (2013.01); *C10J 3/485* (2013.01); *C10K 1/024* (2013.01); *C10K 3/04* (2013.01); *C01B 3/36* (2013.01); *C01B 3/48* (2013.01); *C10J 3/523* (2013.01); *Y02E 20/18* (2013.01); *C01B 2203/0255* (2013.01); *C01B 2203/0283* (2013.01); *C01B 2203/0465* (2013.01); *C01B 2203/049* (2013.01); *C01B 2203/0894* (2013.01)
USPC ....................................................... 252/373

(58) Field of Classification Search
USPC .......................................................... 252/373
See application file for complete search history.

(56) References Cited

U.S. PATENT DOCUMENTS 5,361,728 A * 11/1994 Oda et al. ....................... 122/4 D
5,452,686 A * 9/1995 Stahl ........................... 122/135.1

(Continued)

FOREIGN PATENT DOCUMENTS

DE 10 2006 050603 4/2008
DE 10 2008 013179 6/2009

(Continued)

OTHER PUBLICATIONS

Holger Oleschko, Freisetzung von Alkalien and Halogeniden bei der Kohleverbrennung, Forschungszentrum Jülich, Energy Technology, 2007, pp. 59-60 (with English translation of relevant parts).

(Continued)

*Primary Examiner* — Paul Wartalowicz
(74) *Attorney, Agent, or Firm* — Collard & Roe, P.C.

(57) ABSTRACT

With a method for the generation of synthesis gas by means of gasification of solid or liquid carbonaceous fuels with an oxidation agent containing oxygen, in a reactor, wherein the synthesis gas is passed out of the reactor overhead, and the mineral ash/slag droplets that occur during the reaction are passed out of the reactor downward, in the direction of gravity, it is supposed to be made possible to use a flue-tube boiler, which is clearly less expensive, for heat removal in place of radiant boilers. This is achieved in that the synthesis gas is passed over a hot-gas filter (2), without being cooled, and subsequently passed through a flue-tube boiler (3), for cooling, wherein ash/slag particles precipitated on the hot-gas filter (2) are passed back into the gasification reactor (1), in the direction of gravity.

7 Claims, 2 Drawing Sheets

(56) References Cited

U.S. PATENT DOCUMENTS

Figure 2:
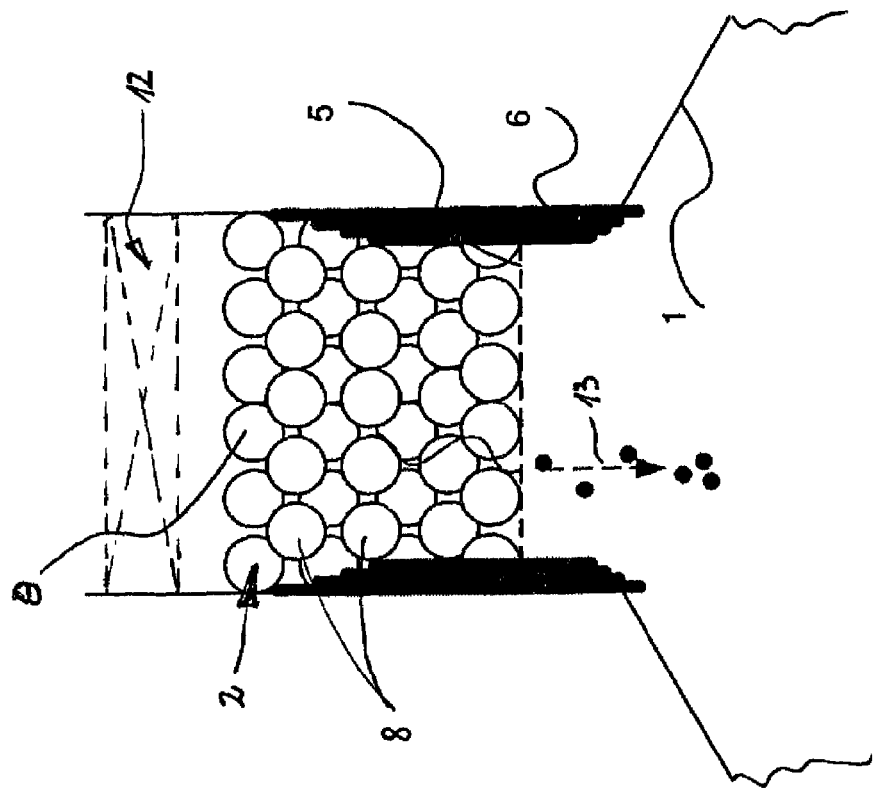

| | | |
|---|---|---|
| 6,435,139 B1 * | 8/2002 | Brucher .................. 122/7 R |
| 6,832,565 B2 | 12/2004 | Chandran et al. |
| 6,958,136 B2 | 10/2005 | Chandran et al. |
| 2010/0148122 A1 | 6/2010 | Breton et al. |
| 2010/0223848 A1 | 9/2010 | Heidenreich et al. |
| 2011/0036013 A1 | 2/2011 | Pavone et al. |
| 2011/0120139 A1 * | 5/2011 | Abraham et al. ........... 60/783 |

FOREIGN PATENT DOCUMENTS

| | | |
|---|---|---|
| DE | 10 2008 026267 | 12/2009 |
| EP | 0 423 401 | 4/1991 |
| WO | WO 00/11115 | 3/2000 |
| WO | WO 03/099965 | 12/2003 |
| WO | WO 2004/094023 | 11/2004 |
| WO | WO 2008/135226 | 11/2008 |
| WO | WO 2009/080334 | 7/2009 |
| WO | WO 2009/146784 * | 12/2009 .......... F02C 3/22 |

OTHER PUBLICATIONS

International Search Report of PCT/EP2011/004435 dated Feb. 21, 2012.

International Preliminary Report on Patentability of PCT/EP2011/004435 dated Mar. 19, 2013, with Written Opinion of the International Searching Authority.

Holger Oleschko, Freisetzung von Alkalien and Halogeniden bei der Kohleverbrennung, Forschungszentrum Jülich, Energy Technology, pp. 59-60 (with English translation of relevant parts), 2007.

Response to International Search Report in PCT/EP2011/004435 dated Apr. 17, 2012, (with English translation of relevant parts).

* cited by examiner

METHOD FOR THE GENERATION OF SYNTHESIS GAS

CROSS REFERENCE TO RELATED APPLICATIONS

This application is the National Stage of PCT/EP2011/004435 filed on Sept. 2, 2011, which claims priority under 35 U.S.C. §119 of German Application No. 10 2010 045 537.7 filed on Sep. 15, 2010, the disclosure of which is incorporated by reference. The international application under PCT article 21(2) was not published in English.

The invention is directed at a method for the generation of synthesis gas, of the type indicated in the preamble of claim 1.

Such a method, which is also concerned with the removal of liquid ash and alkalis from a synthesis gas, is described by WO 2009/080334 A2 of the applicant.

Worldwide, a great number of facilities exist for gasification of coal and biomasses. The predominant number of these facilities serve for the generation of synthesis gas, ammonia, hydrogen or methanol.

Consensus exists that the method of entrained-flow gasification is particularly practical for IGCC power plants and for the production of synthetic energy carriers. However, the availability of the entrained-flow gasifiers must be significantly increased.

In processes of entrained-flow gasification, the process temperature is raised to such a level that the mineral components of the coal are melted to become liquid slag. The slag flows downward over the cylindrical wall of the reactor, and leaves the gasifier through the slag hole in the conical region of the gasifier. It gets into a water bath (slag bath), where it becomes solid and granulates into small, glass-like granulates. However, a small proportion of liquid ash droplets is entrained by the synthesis gas and gets into the crude gas cooler, by way of the gas exit.

However, the synthesis gas that exits from the upper region of the gasifier possesses a temperature that is greater than 1500° C. At this temperature, the flue ash particles are more or less liquid and adhesive. For this reason, the synthesis gas must be cooled down to a non-adhesive range of approximately 850 to 900° C., before it is allowed to enter into contact with the heat exchanger pipes of the flue-tube boiler.

The flue-tube boiler has a plurality of applications in the heat utilization of flue gases. The entry temperature, above all, is limiting for its use, because ash particles contained in the flue gas are adhesive to liquid/molten above 850° C.

There are also a great number of gasification methods that carry out waste heat utilization in different ways, whereby the hot crude gas is first partially cooled with water, or with cold gas in a quenching pipe, to temperatures around 850° C., before the gas is deflected and utilized in the convective boiler.

It is the task of the invention to create a method of procedure that makes it possible to use flue-tube boilers, which are clearly less expensive, for heat removal in place of radiant boilers.

This task is accomplished, according to the invention, with a method of the type indicated initially, in that the synthesis gas is passed over a hot-gas filter, without being cooled, and subsequently passed through a flue-tube boiler, for cooling, whereby ash/slag particles precipitated at the hot-gas filter are passed back into the gasification reactor, in the direction of gravity.

With the invention, a problem is solved, namely that in the case of premature cooling of the particles, these bake onto the flue-tube boiler and thereby clog it, which leads to frequent shut-down for cleaning the corresponding system parts. This is avoided with the invention.

Embodiments of the invention are evident from the dependent claims. In this connection, it can be provided that the hot-gas filter is configured as a ceramic filter, whereby the vapor-form alkalis contained in the non-cooled synthesis gas are removed from the synthesis gas by means of or after bringing them into contact with getter ceramic.

Aside from the configuration of the hot-gas filter using ceramic particles, a further possibility consists, for example, in using cooled pipes in the filter, having a coating, for example by way of a coating with ceramic, which is applied there, for example by way of studding; other filter configurations are also possible here.

According to the invention, it is provided, in one embodiment, that gas velocities of 1 to 10 m/s, particularly 3 m/s, are set in the hot-gas filter. For optimal heat transfer, it can also be provided, in this connection, that the gas velocity in the flue-tube boiler is set to 15-25 m/s.

Practical embodiments according to the invention consist in that gasification is carried out in the reactor at temperatures of 800 to 1800° C. and operating pressures of 0.1 to 10 MPa, and that additives are mixed in ahead of the filter, for precipitation of contaminants on the filter.

Finally, it can also be provided, in the method of procedure according to the invention, that flow takes place through multiple filter stages, one after the other, whereby the exit temperature of the gas behind the last filter stage is set to be above the melting temperature of the ash/slag. Thus, it is possible, for example, according to the invention, to first use a hot-gas filter for slag removal, and subsequently to use a filter composed of getter ceramic, which then slowly is used up during the period of operation, and must occasionally be replaced.

To accomplish the stated task, the invention also provides for a system having a reactor for the production of synthesis gas, from carbonaceous fuels, while supplying oxidation agents that contain oxygen into the reactor, and having flue-gas cooling, which reactor is characterized in that first, in the flow direction of the crude gas, the reactor is followed first by an ash/slag particle filter with a subsequent filter composed of getter ceramic, and these are followed by a flue-tube boiler for gas cooling.

A further embodiment of such a system can consist, according to the invention, in that the ceramic hot-gas filter has a ceramic support network and a bulk fill composed of fill bodies.

In a further embodiment, it can be provided that pressure monitoring is provided at the filter and at the flue-tube boiler, to detect the operating and/or difference pressure.

In this connection, the system can be characterized, in a further embodiment, in that the fill bodies used at the filter(s) can be configured as balls, Raschig rings, impact rings, Stattel bodies, or as cylindrical bodies, or as irregular bodies that are formed by crushing of natural materials, whereby the fill bodies can have a honeycomb or lamella structure.

In the following, the invention will be explained in greater detail using the drawing as an example. This shows, in FIG. 1 a schematic representation of a gasification reactor, FIG. 2 an enlarged representation of the gasification reactor with hot-gas filter, and in FIG. 3 a fundamental flow chart of the method of procedure according to the invention.

Figure 1:
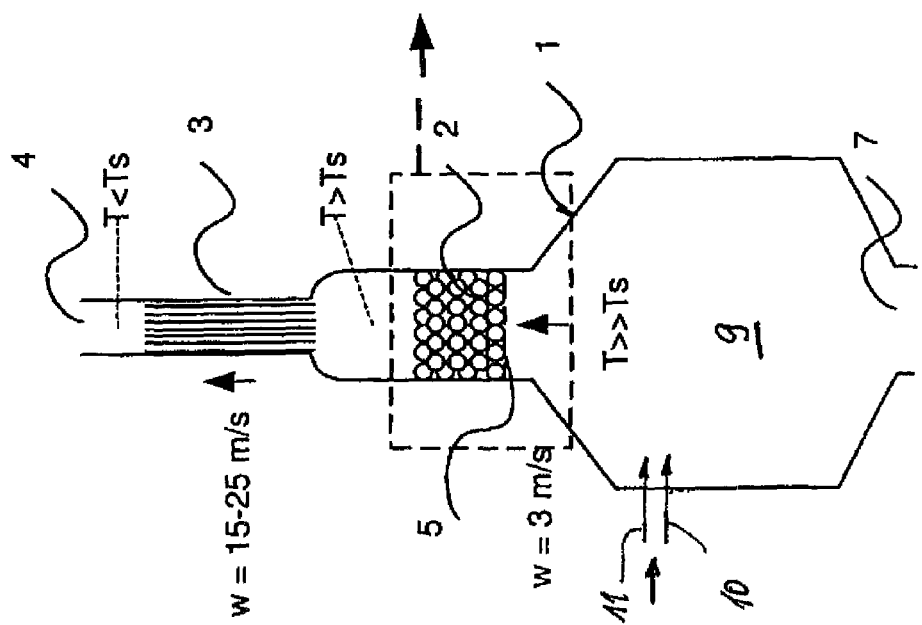

In FIG. 1, a gasification reactor, designated in general as 1, is shown schematically; it has a hot-gas filter, designated in general as 2, assigned to it in its head region, followed by a flue-tube boiler 3.

The reactor 1 and the filter 2 are therefore disposed one directly on top of the other, i.e. the filter 2 more or less forms the reactor exit. In this way, contrary to the state of the art, an additional container, an additional slag discharge organ, and the heat losses connected with them, are avoided.

In the example shown, the hot-gas filter has ceramic fill bodies 8 that lie on a ceramic network 5. The molten/liquid ash that is precipitated there is designated as 6 in FIG. 2; it is recirculated into the reactor interior 9 equipped with a slag outlet 7, as indicated by an arrow 13.

The feed of fuel, for example, and water vapor into the reactor interior 9 is shown with two arrows 10 and 11, in simplified manner.

In the representation example of FIG. 2, a getter ceramic filter 12 is also indicated above the hot-gas filter 2; this filter is consumed during use as intended, for example, and is positioned there in replaceable manner, something that is not shown in further detail.

In FIG. 1, the parameters
T=local temperature,
$T_s$=melt temperature of the slag
w=flow velocity of the gas, in each instance,
are also indicated.

Figure 3:
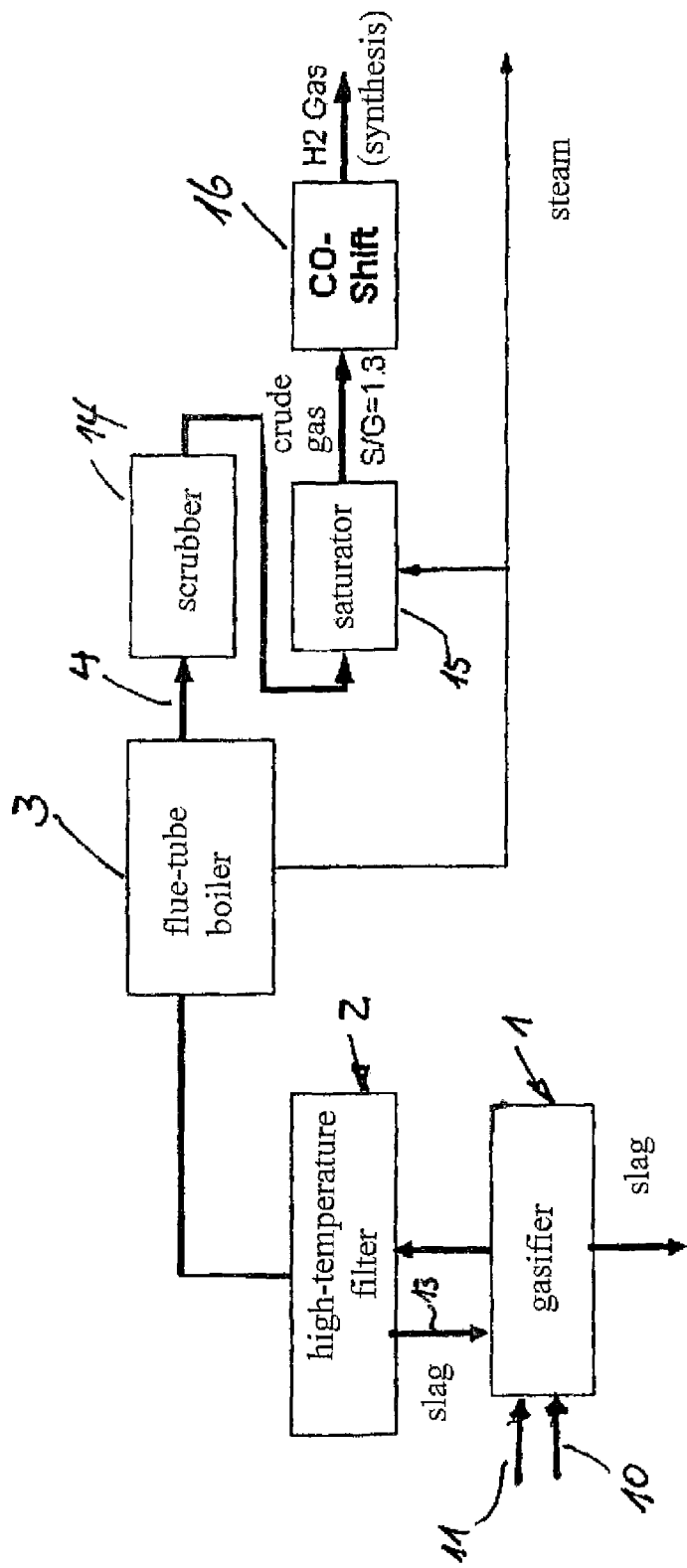

FIG. 3 shows a schematic method flow chart, using the gasification reactor 1 according to the invention, with a subsequent high-temperature filter 2 and once again subsequent flue-tube boiler 3.

The slag recirculation from the high-temperature filter 2 is symbolically represented by an arrow 13, as was also the case in FIG. 2; the feed of fuel and water vapor is also shown in the same manner (arrows 10 and 11).

As shown in FIG. 3, a scrubber 14, a saturator 15, and a CO shift 16 follow the flue-tube boiler 3.

Because the filter 2 is assigned to the reactor 1 in the head region of the reactor 1, a very compact construction is furthermore obtained, since the hot gas (T>$T_s$) can be deflected, because no slag particles are present in the gas any longer. In the state of the art, in contrast, the hot gas is boiler and thus shut-downs, before it can get into the cooled far below $T_s$, in order to prevent clogging of the flue-tube flue-tube boiler or waste heat boiler. The advantage of a filter 2 assigned to the reactor 1 in the head region therefore also lies in that hot gas at very high temperatures (~1,500° C.) can be used for steam production, not just starting from a temperature of approximately 850 to 900° C.

Of course, the exemplary embodiment of the invention that has been described can still be modified in many respects, without departing from the basic idea. Thus, for example, the alkalis can be bound by means of the getter particles, which are added to the flue-gas stream as additives, and more of the like.

The invention claimed is:

1. Method for the generation of synthesis gas via gasification of solid or liquid carbonaceous fuels with an oxidation agent containing oxygen, in a reactor,
   wherein the synthesis gas is passed out of the reactor overhead, and the mineral ash/slag droplets that occur during the reaction are passed out of the reactor downward, in the direction of gravity,
   wherein gasification is carried out in the reactor at temperatures of 800° C. to 1800° C.,
   wherein the synthesis gas is passed over a hot-gas filter, without being cooled, and subsequently passed through a flue-tube boiler, for cooling, and
   wherein ash/slag particles precipitated on the hot-gas filter are passed back into the gasification reactor, in the direction of gravity.

2. Method according to claim 1, wherein the hot-gas filter is configured as a ceramic filter, and
   wherein the vapor-form alkalis contained in the non-cooled synthesis gas are removed from the synthesis gas via or after bringing them into contact with alkali-binding material applied to ceramic of the ceramic filter.

3. Method according to claim 1, wherein gas velocities of 1 to 10 m/s are set in the hot-gas filter.

4. Method according to claim 1, wherein the gas velocity in the flue-tube boiler is set to 15-25 m/s.

5. Method according to claim 1, wherein gasification is carried out in the reactor at operating pressures of 0.1 to 10 MPa, and wherein additives are mixed in ahead of the filter, for precipitation of contaminants on the filter.

6. Method according to claim 1, wherein flow takes place through multiple filter stage followed by a second filter stage, and
   wherein the exit temperature of the gas behind the second filter stage is set to be above the melting temperature of the ash/slag.

7. Method according to claim 1, wherein the hot-gas filter disposed in a head region of the reactor.

* * * * *

UNITED STATES PATENT AND TRADEMARK OFFICE
CERTIFICATE OF CORRECTION

| | | |
|---|---|---|
| PATENT NO. | : 8,877,097 B2 | Page 1 of 1 |
| APPLICATION NO. | : 13/823230 | |
| DATED | : November 4, 2014 | |
| INVENTOR(S) | : Dostal et al. | |

It is certified that error appears in the above-identified patent and that said Letters Patent is hereby corrected as shown below:

In the Claims

In Column 4, line 40 please change the word "multiple" to correctly read:
-- a first --.

In Column 4, line 46 before the word "disposed" please insert: -- is --.

Signed and Sealed this
Tenth Day of February, 2015

Michelle K. Lee
*Deputy Director of the United States Patent and Trademark Office*